(12) United States Patent
Seeds

(10) Patent No.: US 7,844,601 B2
(45) Date of Patent: Nov. 30, 2010

(54) QUALITY OF SERVICE FEEDBACK FOR TECHNOLOGY-NEUTRAL DATA REPORTING

(75) Inventor: Glen Seeds, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 11/472,822

(22) Filed: Jun. 22, 2006

(65) Prior Publication Data

US 2007/0033178 A1 Feb. 8, 2007

(30) Foreign Application Priority Data

Jun. 23, 2005 (CA) .................................. 2510644

(51) Int. Cl.
G06F 7/00 (2006.01)
G06F 17/30 (2006.01)

(52) U.S. Cl. ..................... 707/722; 707/736; 707/758

(58) Field of Classification Search ................ 707/722, 707/736
See application file for complete search history.

(56) References Cited

U.S. PATENT DOCUMENTS

| | | | |
|---|---|---|---|
| 6,175,829 B1 * | 1/2001 | Li et al. ........................ 707/3 |
| 6,535,874 B2 * | 3/2003 | Purcell ........................... 707/3 |
| 6,609,123 B1 * | 8/2003 | Cazemier et al. ............... 707/4 |
| 6,618,721 B1 * | 9/2003 | Lee ................................ 707/3 |
| 6,834,288 B2 * | 12/2004 | Chen et al. ............... 707/104.1 |
| 7,107,262 B2 * | 9/2006 | Dettinger et al. ............... 707/3 |
| 2003/0014394 A1 * | 1/2003 | Fujiwara et al. ................ 707/3 |
| 2003/0115065 A1 * | 6/2003 | Kakivaya et al. ......... 704/270.1 |
| 2004/0034615 A1 * | 2/2004 | Thomson et al. ............... 707/1 |
| 2005/0010570 A1 * | 1/2005 | Styles ............................ 707/4 |
| 2005/0060292 A1 * | 3/2005 | Day et al. ...................... 707/3 |
| 2005/0222965 A1 * | 10/2005 | Chaudhuri et al. ............. 707/1 |
| 2006/0010126 A1 * | 1/2006 | Anick et al. ................... 707/4 |
| 2006/0149724 A1 * | 7/2006 | Ritter et al. .................... 707/4 |
| 2006/0248057 A1 * | 11/2006 | Jacobs et al. .................. 707/3 |
| 2007/0033178 A1 * | 2/2007 | Seeds ............................ 707/4 |

* cited by examiner

*Primary Examiner*—John R. Cottingham
*Assistant Examiner*—Michael Pham
(74) *Attorney, Agent, or Firm*—Shumaker & Sieffert, P.A.

(57) ABSTRACT

A system for providing feedback associated with the planning of a query is provided. The system comprises a query planning mechanism capable of determining transformations required for the execution of the query, and a monitoring mechanism for monitoring and extracting feedback information from the planning mechanism, the feedback information including an indication of the transformations.

8 Claims, 5 Drawing Sheets

QUALITY OF SERVICE FEEDBACK FOR TECHNOLOGY-NEUTRAL DATA REPORTING

FIELD OF INVENTION

The present invention relates to databases and more particularly relates to a procedure for querying databases.

BACKGROUND OF THE INVENTION

In a query operation a user selects and runs a query on a given database within a Database Management System (DBMS) to obtain desired information. A so called "data agnostic query" would, in its truest implementation, allow the ability to query any combination of data sources in a way that is transparent to the technology used by these sources. However, a user performing a data agnostic query may experience different levels of quality of service due to differences in the DBMS's within which the data sources are located.

The quality of service for individual query capabilities may vary depending on the DBMS and query. In particular different DBMS's may have various levels of support for the different operations of a query. This can result in seemingly simple queries that execute well against some DBMS's while the same query may run poorly or possibly fail when run against the same data in a different DBMS.

In a data agnostic query system a user may request a particular construct (call it X) as part of an incoming query. However, in light of the particular data source that is being queried there may be a reason Y such that X must be transformed into an equivalent construct Z. During the subsequent running of the query the user may encounter delays and or errors. If provided with information regarding X, Y, and Z, the user may be able to better construct the query to avoid the problems that were encountered.

Therefore there is a need for a system and method of operation thereof that provides quality of service information to a user running a query.

SUMMARY OF THE INVENTION

It is an object of the invention to provide information to the user for tracing the steps performed in a data agnostic query.

According to an aspect of the invention a system for providing feedback associated with the planning of a query is provided. The system comprises a query planning mechanism capable of determining transformations required for the execution of the query, and a monitoring mechanism for monitoring and extracting feedback information from the planning mechanism, the feedback information including an indication of the transformations.

According to another aspect of the invention a method of planning a query including providing feedback information related to the planning is provided. The method comprising the steps of receiving a query, determining a transformation required for the next query part, identifying feedback information, and determining if the planning is complete.

This summary of the invention does not necessarily describe all features of the invention.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

These and other features of the invention will become more apparent from the following description in which reference is made to the appended drawings wherein.

DETAILED DESCRIPTION

The following description is of a preferred embodiment.

Feedback is information provided to the user after the planning and/or execution of the query, which provides insight into the operation of the query, the planning of the query or the execution of the query.

The invention is directed towards a system for and method of providing feedback related to the operation of a query, including the steps taken during the planning of the query. In one embodiment, the query is a so-called data agnostic query i.e. the operation of the query is intended to be independent of the DBMS's encountered by the query. Feedback is provided as a trace through all of the important planning transformations of the query. The feedback should provide insight into the source of any problems encountered during the running of the query, along with an explanation of the cause and possible solutions to these problems. This trace is navigated in terms of the transformation steps and query plan hierarchy.

An example of a basic query 101 that may be run against a database is shown in FIG. 1a. In this example a user would like to determine the sales 102 for a number of products 104 over a number of years 106.

Figure 1:
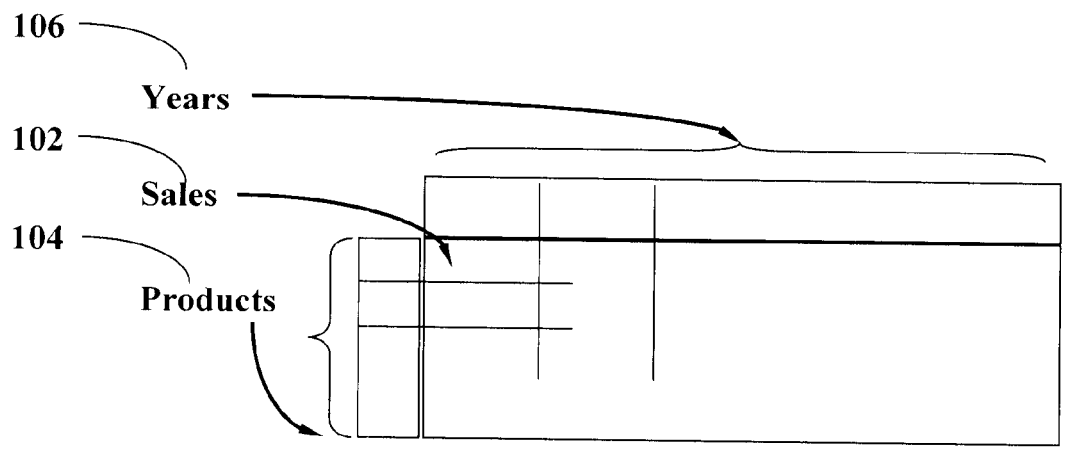
FIG. 1 is a schematic diagram of a user interface in accordance with an embodiment of the present invention.

The operation of the query presented in FIG. 1 may not occur as anticipated by the user. For example, the user may experience some unexpected delays in obtaining the sales 102. Further as an example it is known that relational queries often encounter problems when being run against OLAP databases. When difficulties are encountered during the running of a query the user may wish to obtain information related to its operation including the planning of the query, such that a future query might be modified to improve the operation thereof.

Figure 2:
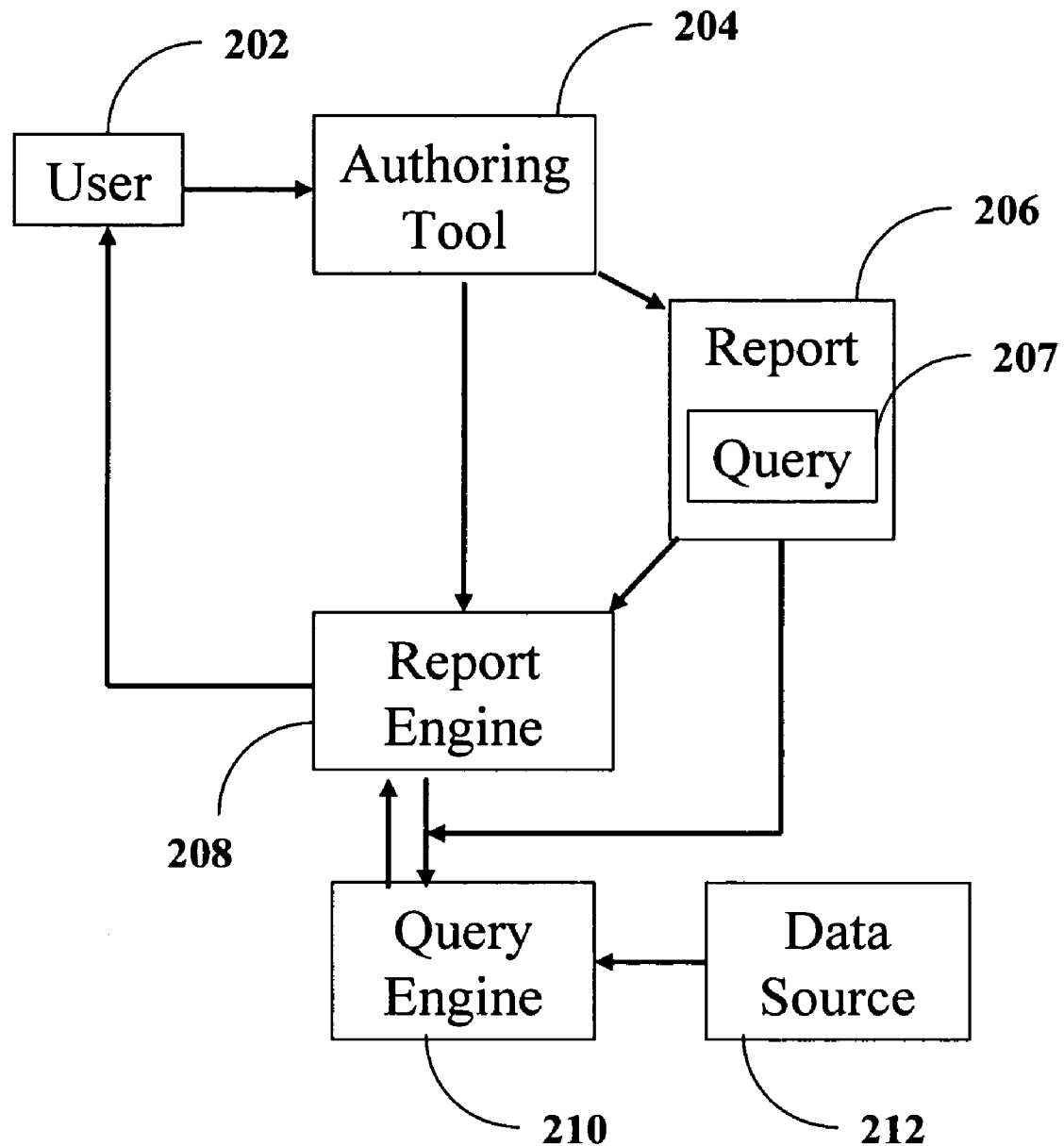
FIG. 2 is a schematic diagram of a query planning system in accordance with an embodiment of the present invention.

An example of a query system is schematically presented in FIG. 2. A user 202 uses an authoring tool 204 to author a report 206 that includes a query 207. The query is provided to the query engine 210 where the query is planned and executed. The query engine 210 draws data from the data source 212 during the execution of the query. When the query has finished executing the results are provided to a report engine 208 where they are compiled into a report that is provided to the user 202.

Figure 3:
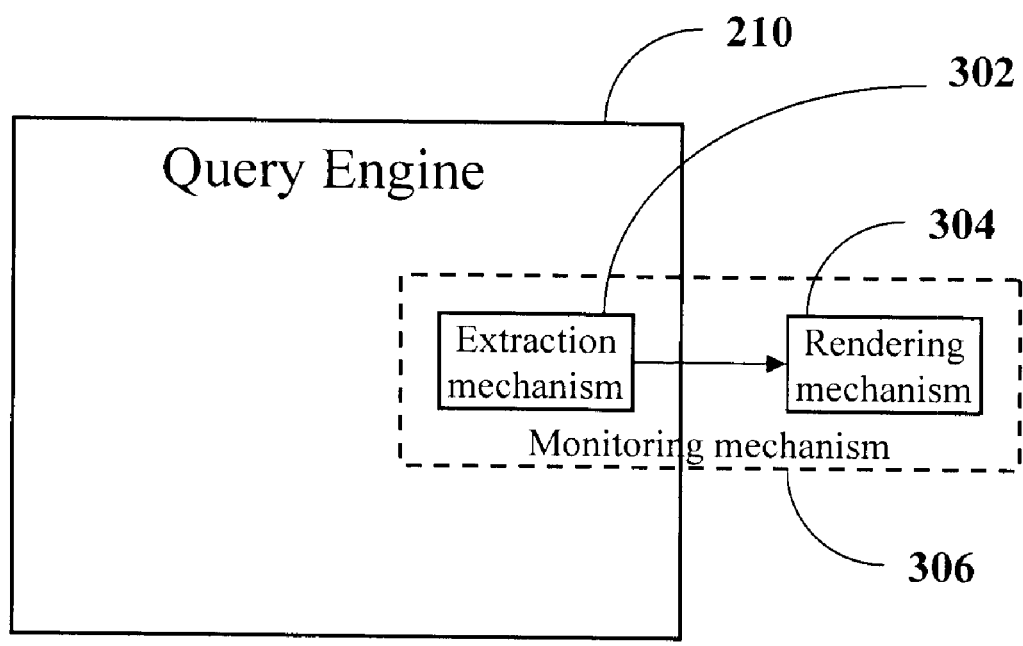
FIG. 3 is a schematic diagram of query engine in accordance with an embodiment of the present invention.

In order to obtain feedback information related to the query planning and execution a system and method of extracting information from the query engine is required. A system for this extraction according to an embodiment of the invention is presented in FIG. 3. Within the query engine 210 is an extraction mechanism 302, which extracts information that will form the basis of the feedback to the user. The information extracted by the mechanism 302 is provided to a rendering mechanism 304. The rendering mechanism lies outside of the query engine 210 and is appropriate for providing the desired feedback information in the appropriate format to the user. The extraction mechanism 302 and the rendering mechanism 304 can be considered as elements of a monitoring mechanism 306.

The operation of a query occurs in two main stages: planning and execution, with the latter stage consuming considerably more computing resources. As one means of reducing the impact of gathering feedback information on the computing resources the system of the present invention allows for query planning to be performed independently from query execution. This permits planning feedback to be obtained without incurring the overhead of executing the query. It also allows for as much feedback information as possible in interactive time. The provision of feedback information from the planning and execution stages of a query will now be considered.

Figure 4:
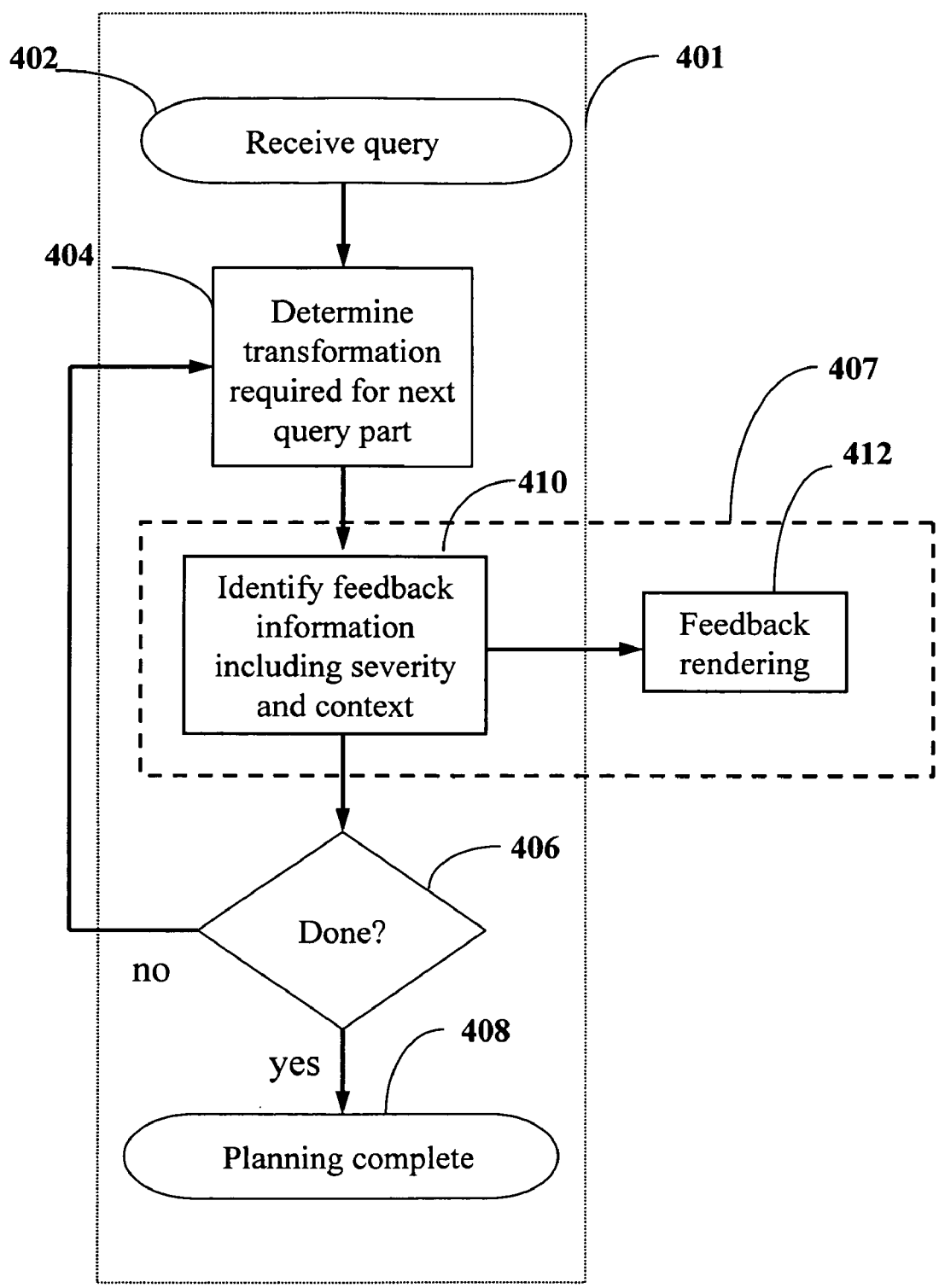
FIG. 4 is a flow chart of the provision of feedback information during query planning according to an embodiment of the present invention.

FIG. 4 presents a flow chart of a basic query planning process according to an embodiment of the present invention. The query planning process 401 is the primary process of FIG. 4. The query planning process 401 may be considered as occurring within a query planning mechanism or a query planner. At step 402 a query is submitted to the query planner. At step 404 any required query transformation for the next query part is determined. Generally transformations will be required when an operation is not appropriate for a particular data source. The determination of the required transformation is performed by the query planner and is outside of the scope of the current discussion. At step 406 it is determined whether the query planning is finished. If the panning is not complete the process returns to step 404 and the next query part is planned. If query planning is finished the process exits at step 408.

According to the system of the present embodiment a sub-process 407, is inserted between steps 404 and 406 of the query planning process 401. This sub-process is provided by monitoring mechanism 306. Step 410 of the sub-process 407 lies within the query planning process 401 and is capable of extracting information therefrom. All query planning feedback information is collected at step 410.

In particular step 410 views the calling context at the point where it is inserted into the query planning process 401. The calling context has determined the potential feedback message, its severity and the context pieces associated therewith. The calling context then calls for feedback rendering, step 412, where the feedback message is prepared for its intended recipient.

The feedback information collected at step 410 includes, but is not limited to, any transformations that occur at step 404, errors and warnings. The feedback information, its severity, message identifiers and context pieces are forwarded for feedback rendering at step 412 with the context pieces being passed to the rendering mechanism 412 as objects.

According to an embodiment of the present invention there are four types of information that are traced and can be recorded and provided to the user as feedback. The information includes, in order of decreasing severity: errors; warnings; key transformations; and feedback, which includes minor transformations; intermediate execution plans; timings and row counts. This information is obtained during the query planning and execution processes. The above list of parameters that are traced is not meant to be limiting. Rather any parameter that is appropriate for the provision of feedback information to the user is within the scope of the invention.

One of the parameters being traced in the current embodiment is key transformations. A transformation transforms one construct within a query into another construct due to a particular reason associated with a data source. A key transformation is a transformation that would prevent one from tracing back to the source if the transformation were not known. In one embodiment a table that identifies which transformations are key transformations is provided. For example, if one requests a rank of total sales which is pushed to the database as RANK(SALES.TOTAL) it would be a simple matter to understand. However, if it is converted to a more complex expression that say uses a sub-select and inside that is an order by a non-indexed column, which is known to be slow, reporting this alone is not helpful, therefore the transformation from the original simple RANK function to the final more complex form is reported.

In the preparation and provision of feedback information it is important to reduce the computational resources required to provide feedback and to prepare this feedback in a manner appropriate to the locale to which it is being provided. With consideration to the above the context pieces are passed to the rendering step 412 as objects where the objects have a built in knowledge of how to render themselves relative to the calling context. Implementing objects that are able to render themselves reduces the computational overhead associated with the rendering step 412. In the object implementation of the current embodiment these objects are Parameter objects.

Each Parameter object has a Parameter interface created for it. The Parameter interface has a method called Render. The Parameter interface returns a string with the string being a human readable representation of the Parameter object. The string is expressed in a locale that is specified in the Render method. Therefore each object that the calling context wishes to be able to pass to the rendering step 412 as a Parameter object would have a corresponding Render method. Further, a concrete class would be created for each of the Parameter objects, implementing the Parameter interface, including the Render method.

A Queryfeedback class would exist, with an Add method that expects a message severity, a message identifier and an array of Parameter objects. The identified message would have text for each supported locale, including a placeholder to indicate the positioning the message text of each expected parameter.

Rendering step 412 implements thresholds that are established by the user and system administrator and used to determine what is sent to the user and system logs. The threshold level is set to the desired message type level with possible thresholds including errors, warnings, key transformations and information. Only those messages whose severity is at or above the specified thresholds will be rendered at rendering step 412.

In the case where the message severity exceeds the threshold for the system log, then the message text for the system logging locale is located from its identifier, Render method is called on for each element of the array of Parameter objects and the resulting text is substituted for the corresponding placeholder in the message text. The resulting message is fully readable by a human reader of the language specified in the system logging locale. The message is appended to the system log.

With the feedback information now gathered from the planning and execution stage of the query the information must be reported. This information is reported in two ways: in a system log controlled by an administrator, and as information returned to the user in the response to the query. Further the information is rendered in a manner appropriate to the locale for which it is intended. Namely the render method is called when the severity exceeds the threshold for a particular locale. Therefore if the user and administrator belong to different locales, then each message whose severity exceeds both user and system log thresholds must be rendered twice i.e. once for each locale.

The use of thresholds is central to the reduction of the computational resources required for the provision of feedback. The threshold for feedback information indicates the minimum level of severity of feedback information that is forwarded to the user and administrator with both the administrator and the user using separate threshold levels. As well as reducing the processing requirements the use of a threshold approach to the provision of information helps avoid overwhelming the user with unwanted information.

Figure 5:
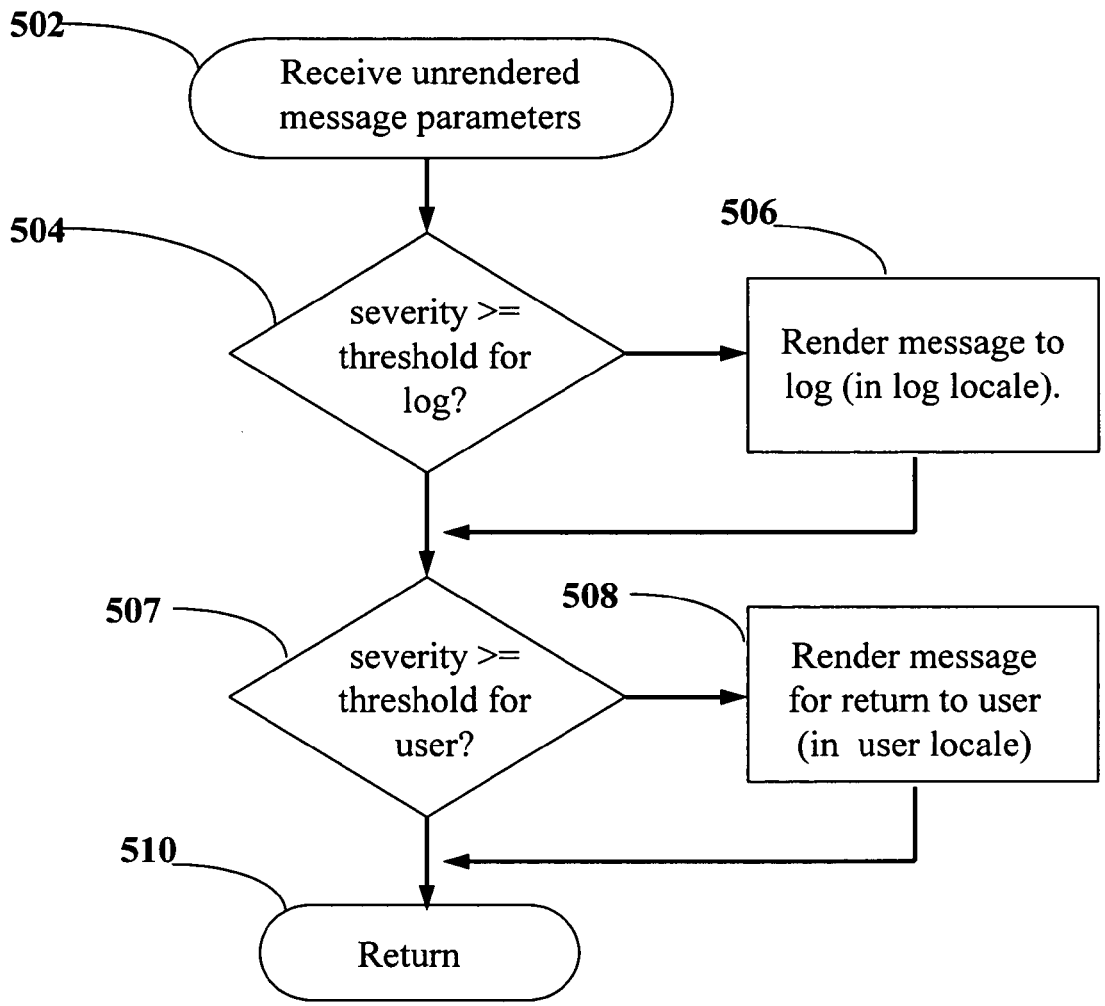
FIG. 5 is a flow chart of message rendering according to an embodiment of the present invention.

The use of thresholds in the delivery of feedback information is provided for by the rendering step 412, where rendering step 412 can be considered as being part of a rendering mechanism. FIG. 5 is a flow chart illustrating steps that occur within the rendering step 412. At step 502 the engine receives the unrendered message parameters. These include the threshold for feedback information supplied by the user. At step 504 the severity of the messages provided in step 502 is checked to determine if it is above the threshold set by the administrator for the log. If the threshold is met the message is rendered to the log at step 506. After the message is rendered at step 506 or the threshold is not met at step 504 the severity of the message is checked against the user threshold at step 507. If the user threshold is met at step 507 the message is rendered to the user at step 508. The process is then exited at step 510.

Feedback information captured during the execution of the query includes execution times and messages from the data source.

The feedback information provided the user and the system administrator can be used in numerous ways. Generally the next step in the operation of the query will be at least partially influenced by the received feedback information. For example, the author of the query could ask for this feedback before making the query available for general use. This makes it possible to detect potential problems before they occur in a production use. The author could also do this in response to a complaint from a user or system administrator that a report is taking too long, or is failing, or is giving unexpected results. A system administrator could ask for this feedback on a system-wide level, to assist in determining the cause of generally poor system response. A system administrator could also do this to monitor the health of the system, to determine whether there are questionable reports being run.

The above examples are illustrative in nature and in no way limit the use of the information provided by the embodiments of the invention. The uses of the information will be determined by a user and or system administrator with consideration to the particular query and operational circumstances there around.

The operation of the invention will be illustrated with regard to the following example.

A query is to be performed on information related to a number of products. The dimension of this query is products, with levels Line, Type and Item. Each level is stored as a separate normalized table.

The desired query is as follows: Products.Line.Name; Products.Line.Description; Products.Item.Name and Products.Item.Description.

The database contains a list of product items, with name, description, and type for each a list of product types, with name, description, and line for each, and a list of product lines, with name and description for each. The query of interest is interested in the product line name and description, and product item name and description for all product items.

During the query planning process 401 the following query plan has been established; Products.Item is joined to Products.Line via Products.Type.

Based on the above query plan the calling context has determined the following:
1—There is a potential feedback message to be generated. Its message ID is "QP1". (The English template for this message is "%1 is joined to %2 via table %3".);
2—The severity of this feedback message is KeyTransformation;
3—The current context is held in object C;
4—The internal objects corresponding to feedback context pieces Products.Line, Products.Item, and Products.Type are X1, X2, and X3 respectively. (Each of these contains a reference to C.); and
5—The calling context calls the feedback rendering with the above information, e.g. Feedback(KeyTransformation, "QP1", X1, X2, X3).

With consideration to the above there will be two examples of threshold considered. In case 1 the feedback level threshold specified by user is "Error". The feedback rendering mechanism checks the threshold level (Error) against the feedback supplied (KeyTransformation). Since the latter is below the former, nothing is rendered.

In case 2 the feedback level threshold specified by user: is "information". In this case the feedback rendering mechanism checks the threshold level (Information) against the feedback supplied (KeyTransformation). Since the latter exceeds the former, the feedback must be rendered. Each of the parameters is rendered to displayable form (using their internal access to the calling context C):
  %1: "Products,Line";
  %2: "Products.Item"; and
  %3: "Products.Type".

The rendered forms are substituted in to the corresponding locations in the message template "%1 is joined to %2 via table %3" to yield the rendered message: "Products.Line is joined to Products.Item via table Products.Type".

The present invention has been described with regard to one or more embodiments. However, it will be apparent to persons skilled in the art that a number of variations and modifications can be made without departing from the scope of the invention as defined in the claims.

What is claimed is:

1. A method of reporting quality of service feedback information for a query to a data source of a database management system, the method comprising:
  receiving an agnostic query, wherein the agnostic query is independent of the database management system;
  executing the agnostic query;
  determining, with a computing resource of the database management system, a transformation required for execution of the agnostic query during a planning stage of the execution of the agnostic query, wherein the transformation transforms a first construct within the agnostic query into a second construct to enable the agnostic query to be executed with respect to the data source of the database management system, wherein the first construct is not appropriate for the data source of the database management system, and wherein the second construct is appropriate for the data source of the database management system;
  during the planning stage of the execution of the agnostic query, collecting, with the computing resource, the quality of service feedback information concerning a quality of service of the execution of the agnostic query by the computing resource, the quality of service feedback information defining a trace through the transformation required for execution of the agnostic query with respect to the data source of the database management system, wherein the quality of service feedback information includes the transformation, a severity and a context, the context including an object for rendering the feedback information appropriate to an intended locale;

comparing, with the computing resource, the severity to an established threshold, the established threshold indicating a minimum level of severity of feedback information being rendered;

rendering the quality of service feedback information having the severity exceeding the established threshold using the object; and reporting the rendered quality of service feedback information.

2. The method according to claim 1 wherein the established threshold is selected from a group consisting of: an error, a warning, a key transformation, and an information.

3. The method according to claim 2 wherein the key transformation is an unknown transformation preventing tracing back to the data source.

4. The method according to claim 1 wherein the intended locale is a system log.

5. The method according to claim 1 wherein the established threshold is established by a user or a system administrator.

6. The method according to claim 1 wherein the rendered feedback information is reported in a system log controlled by an administrator, or to a user in a response to the agnostic query.

7. The method of claim 1, further comprising:

receiving additional quality of service feedback information from the data source during an execution stage of the agnostic query, the additional quality of service feedback information including a time required for the data source to execute the agnostic query; and updating the quality of service feedback information to include the additional quality of service feedback information received from the data source.

8. The method of claim 1, wherein receiving an agnostic query comprises receiving an agnostic query with a computing resource, wherein executing the agnostic query comprises executing the agnostic query with the computing resource, and wherein reporting the rendered quality of service feedback information comprises reporting the rendered quality of service feedback information with the computing device resource.

* * * * *